United States Patent [19]

Dörge et al.

[11] Patent Number: 4,880,259
[45] Date of Patent: Nov. 14, 1989

[54] HIGH-TEMPERATURE-RESISTANT TYPE COUPLING

[75] Inventors: Franz Dörge, Keltern; Udo Erlenmayer, Pforzheim; Bernd Faber, Lörrach; Winfried Herty; Günter Munz, both of Pforzheim, all of Fed. Rep. of Germany

[73] Assignee: Witzenmann GmbH Metallschlauch-Fabrik Pforzheim, Pforzheim, Fed. Rep. of Germany

[21] Appl. No.: 199,380

[22] Filed: May 27, 1988

[30] Foreign Application Priority Data

Jun. 13, 1987 [DE] Fed. Rep. of Germany ....... 3719840

[51] Int. Cl.$^4$ ............................................. F16L 55/04
[52] U.S. Cl. ................................... 285/137.1; 285/47;
285/225; 285/237; 285/286
[58] Field of Search ...................... 285/49, 48, 47, 45,
285/137.1, 200, 223, 224, 225, 235, 237, 299,
300, 301

[56] References Cited

U.S. PATENT DOCUMENTS

| | | | |
|---|---|---|---|
| 1,774,624 | 9/1930 | Aldrich | 285/225 |
| 2,126,706 | 8/1938 | Schmidt | 285/49 |
| 2,504,634 | 4/1950 | Boschi | 285/49 |
| 2,841,419 | 7/1958 | Jay | 285/351 |
| 4,198,078 | 4/1980 | Herbert | 285/49 |
| 4,516,782 | 5/1984 | Usher | 285/910 |
| 4,747,624 | 5/1988 | Faber et al. | 285/231 |

FOREIGN PATENT DOCUMENTS

| | | | |
|---|---|---|---|
| 70652 | 9/1893 | Fed. Rep. of Germany | 285/300 |
| 2222355 | 11/1972 | Fed. Rep. of Germany | . |
| 737253 | 12/1932 | France | 285/225 |
| 597729 | 9/1959 | Italy | 285/225 |
| 189852 | 12/1922 | United Kingdom | 285/300 |

Primary Examiner—Randolph A. Reese
Assistant Examiner—Anthony Knight
Attorney, Agent, or Firm—Frishauf, Holtz, Goodman & Woodward

[57] ABSTRACT

To couple two pipes for hot fluids together, a sealing membrane of temperature and corrosion-resistant material is located transversely within a ring-shaped chamber or space surrounding the end portions of the pipes, the sealing membrane being welded to the adjacent wall portions defining the ring chamber, and the at least one and preferably two sealing and support cushions or pillows being placed adjacent the sealing membrane, to permit limited angular and axial movement of the pipe ends with respect to each other while, effectively, preventing substantial torsional excursion. The membrane may be corrugated or stepped, located transversely to the pipes or at an inclination with respect thereto. Two membranes may be used, inclined towards each other (FIG. 3) and multi-pipe units can be coupled by a single membrane (FIGS. 8, 9).

22 Claims, 8 Drawing Sheets

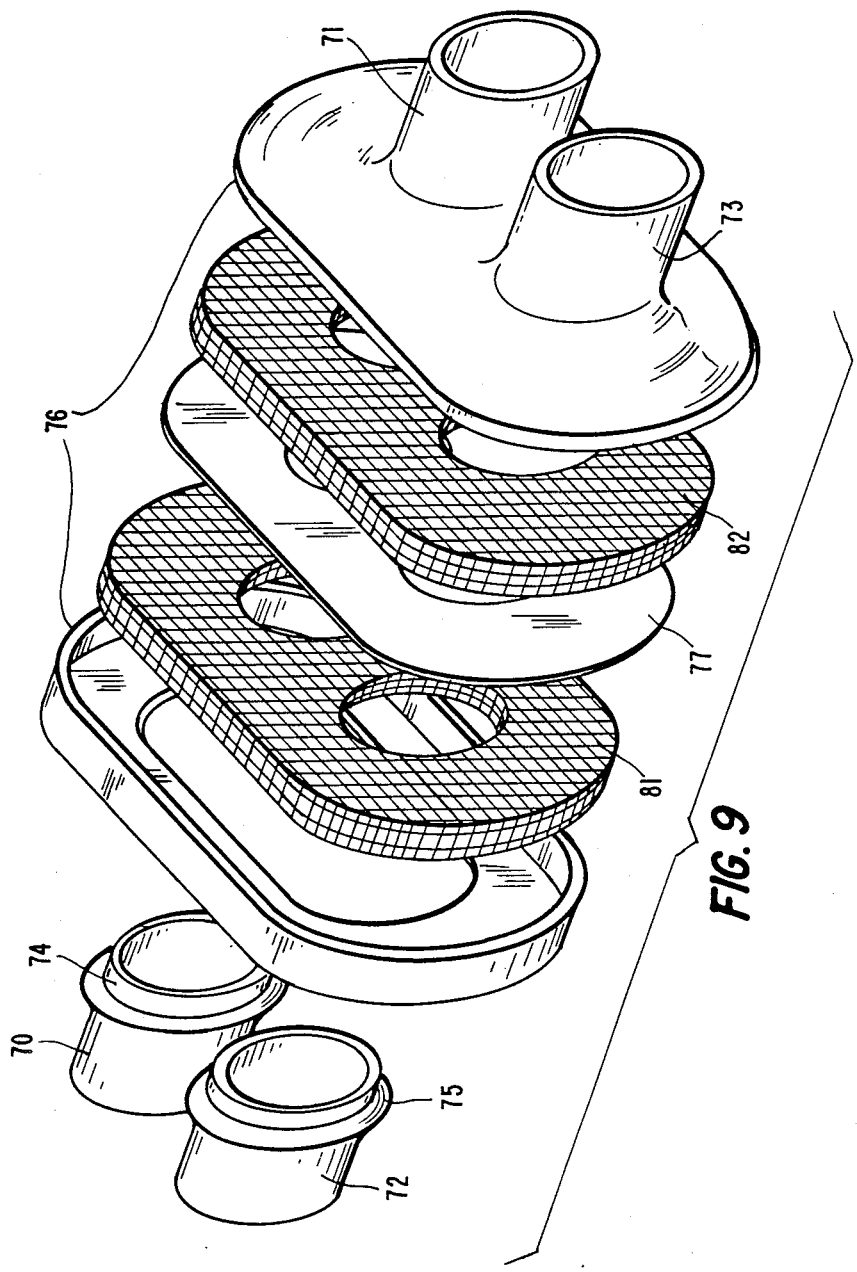

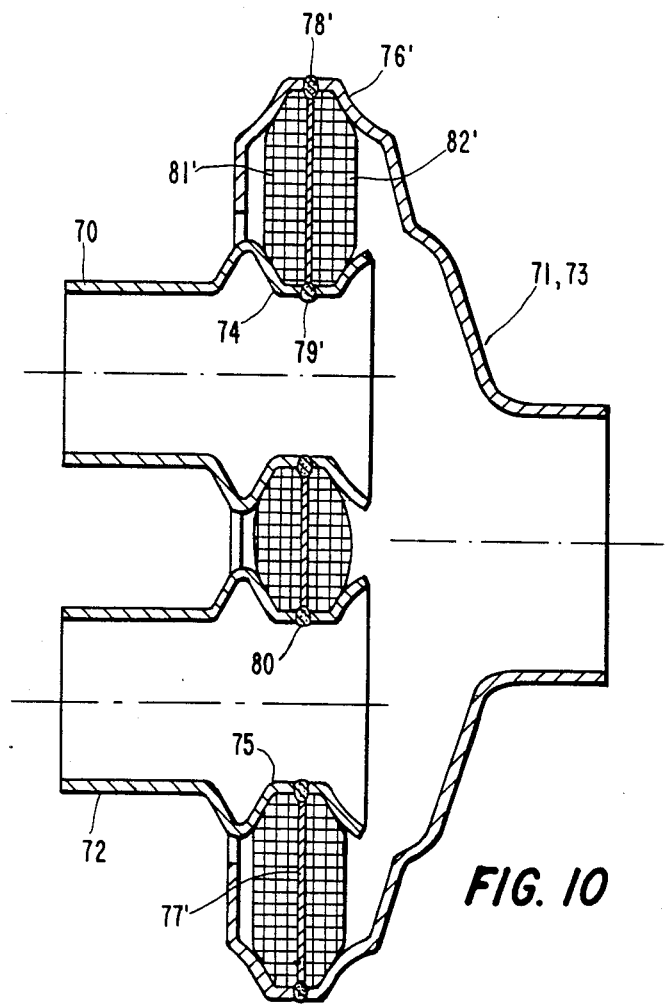

HIGH-TEMPERATURE-RESISTANT TYPE COUPLING

Reference to related application, assigned to the assignee of the present invention, the disclosure of which is hereby incorporated by reference: U.S. Ser. No. 06/930,280, filed Nov. 12, 1986, now Pat. No. 4,747,624, May 31, 1988, Faber et al. Reference to related disclosure: German Published patent specification 22 22 355, Hallett (claiming U.S. priority of Ser. No. 141,515, May 10, 1971).

The present invention relates to coupling of two pipes or tubular elements which are adapted to conduct hot media, and specifically exhaust gases from internal combustion engines, particularly from automotive combustion engines.

BACKGROUND

The referenced application Ser. No. 06/930,280, filed Nov. 12, 1986, assigned to the assignee of the present application, and the disclosure of which is hereby incorporated by reference, now U.S. Pat. No. 4,747,624, describes a connection arrangement to connect two pipes, particularly for conveying hot fluids, and especially exhaust gases from internal combustion engines, in which one of the pipes has an end portion facing the end portion of the other, the connection arrangement connecting the pipes together while permitting relative movement of the pipes in axial, lateral, and twist or torsion directions. Special arrangements are provided to prevent escape of fluids to ambient space which includes a sealing pillow located in a ring chamber in which the sealing pillow has a sealing membrane embedded therein, the sealing membrane extending over the entire radial region of the space or chamber. The sealing membrane is made of a temperature-resistant and corrosion-resistant material.

The sealing cushion may be a ceramic or metal structure formed of fibers or matted material which may be woven, knitted, felted or otherwise shaped, for example of compressed fibers or fiber particles. The ring chamber is formed by wall elements which may include abutments formed, for example, by snap rings or the like, to maintain axial positioning of the respective elements. In operation, the sealing chambers and the sealing membranes, which form unitary combinations, may be radially compressed, and it has been found that such radial compression may lead to loss of sealing effectiveness or to leakages. The seal has the advantage that it is movable in torsion or twist. This, however, can become excessive and substantial freedom in torsional or twisting movement is undesirable for many applications, even if portions of the sealing cushions are retained in projecting wall portions secured to, or forming part of the respective pipe elements. In operation, and particularly when subjected to hot exhaust gases, leakages may occur and the sealing cushions, particularly upon settling, may slip within the overal arrangement.

German Pat. No. 22 22 355 discloses a flexible connection of two pipe ends in which a bellows or corrugated tube element forms a primary seal. A secondary seal is formed by a ring plate secured to one of the pipe elements, and slidable with respect to a flange surface provided on the other pipe element. There are no sealing cushions, and a primary seal is provided only by the bellows.

THE INVENTION

It is an object to improve a connection arrangement especially of the type of the prior application Ser. No. 06/930,280, now U.S. Pat. No. 4,747,624, that complete sealing can be reliably obtained while permitting acceptance of substantial torsional forces and while not permitting freedom of movement in torsion or twist to a substantial extent.

Briefly, the corrosion-resistant, high-temperature-resistant membrane is bonded along an inner and an outer circumference to the adjacent walls of the structural elements which define the ring chamber. The bonding connection, preferably, is effected by welding the membrane along its outer and inner surfaces with the adjacent wall portions defining the ring space which may, for example, be one or both of the pipe elements, or extension and fittings secured thereto.

The arrangement has the advantage that completely sealed tightness is ensured while providing a high degree of stiffness with respect to torsion or twist. The membrane permits only very slight torsional or twisting movement between the inner circumference and the outer circumference; additional movement between the circumferences of the sealing membrane and the adjacent wall portions of those elements which define the ring space are prevented.

The sealing function of the sealing cushions and the sealing function of the membrane become relatively independent of each other; the sealing cushions, in effect, provide more mechanical support to the end parts of the tubes or pipes facing each other than requiring sealing effectiveness. As a consequence, it is no longer necessary to form the sealing functions as entire unitary circular structures; they can be made in form of ring segments, thus substantially facilitating assembly of the coupling connection, and reducing manufacturing as well as assembly costs. To connect exhaust pipes from automotive engines, thus, this arrangement provides a preferred and inexpensive solution to coupling exhaust pipe elements together.

A plurality of sealing cushions and sealing membranes may be located next to each other. It is, of course, also possible to place sealing cushions between a plurality of sealing membranes, which provides for excellent mechanical support of the membranes; externally located cushions then provide for additional mechanical support and protection against external environmental influences.

DRAWINGS SHOWING AN ILLUSTRATIVE EMBODIMENT

FIG. 9 is an exploded perspective view of the arrangement of FIG. 8.

FIG. 10, is an axial cross-sectional view through a multi-inlet pipe—single outlet pipe sealing arrangement;

DETAILED DESCRIPTION

Figure 1:
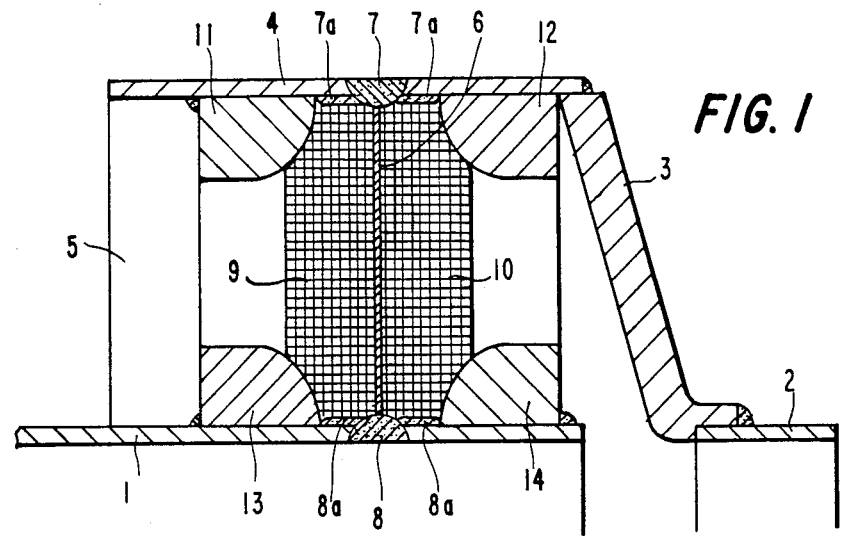
FIGS. 1–7 show different embodiments, in fragmentary axial cross section, of sealing arrangements to connect two pipe portions together. Only so much of the pipe is shown to provide an understanding of the invention, it being understood that the pipes are, for example, circular, and that the elements shown in section are, in plan view, circular or ring-shaped.

Two ends, 1, 2, of respective pipes (FIG. 1) are placed in axial alignment. The pipe end 2 has a radially projecting flange 3 welded thereto, or pipe 2 can be formed with a radially extending flange, preferably inclined towards pipe 1. A cylindrical sleeve 4 is welded to the flange 3, extending over the end portion 1 of the other pipe element, to define an essentially ring-shaped space 5.

A sealing membrane 6 made of high-temperature-resistant and corrosion-resistant material is placed in the space between the sleeve 4 and the outer wall of the end 1 of the pipe.

In accordance with a feature of the invention, the ring-shaped sealing membrane 6 is welded along its inner circumference 8 with the pipe end 1, and further welded along its outer circumference 7 with the sleeve 4.

Two essentially ring-shaped sealing cushions 9, 10 are located adjacent the respective sides of the membrane, the sealing cushions 9, 10 being formed of a metal wire mesh, felted, knitted or woven structure, which has retained therein a sealing and sliding compound, for example pressed into the interstices of the mesh or woven material of the cushions 9, 10. The sealing cushions engage the pipe 1 and the sleeve 4 without play. In axial direction, the sealing cushions are retained between outer support rings 11, 12 and inner support rings 13, 14. Preferably, the support rings 11-14 are rounded at the region facing the sealing cushions 9, 10 to prevent engagement by a sharp edge which might tear into the sealing cushion during dynamic loading of the pie ends 1, 2, or relative movement thereof.

The connection between the pipe ends 1, 2 will be flexible, as can be seen, and permit some deflection from true axial alignment with respect to axial as well as angular movement. Thus, the pipes extending from the ends 1, 2 can move with respect to each other. The sealing membrane 6, welded, in accordance with the invention at weld beads 7, 8, practically immovably supports the two pipes with respect to torsional movement. Thus, with respect to torsion or twist of pipe end 1 with respect to pipe end 2, an effectively immovable connection will result.

The coupling between the pipe ends is completely fluid-tight, both with respect to gases as well as with respect to liquids, since the membrane 6 is securely bonded to the circumferences of the adjacent walls defining the ring-shaped chamber and, especially, upon being welded. The sealing cushions 9, 10 have, as their essential function, supporting effect with respect to the two pipe ends 1, 2, that is, they can absorb relatively arising forces and movement.

The sealing membrane 6, as schematically shown in FIG. 1, preferably is a multi-element structure, that is, a ring-shaped structure formed of a plurality of layers. Thus, even if one of the layers of the sealing membrane should tear or become leaky, the remaining layers of the multi-layer membrane will retain their sealing tightness.

The cushions or pillows 9, 10 are compacted in the region of their outer and inner circumference and can be melted-in or welded, by part of the weld beads 7, 8, as shown schematically at 7a, 8a in FIG. 1. Connecting the sealing cushions also by welds increases the stability, and hence the load acceptability of the connection arrangement.

The sealing membrane 6 may extend in radial direction, that is, in a plane perpendicular to the axis of the pipes. Thus, support of the pipes in axial loading is obtained independently of the direction from which a force is exerted against the pipes, that is, whether from the right or from the left.

Figure 2:
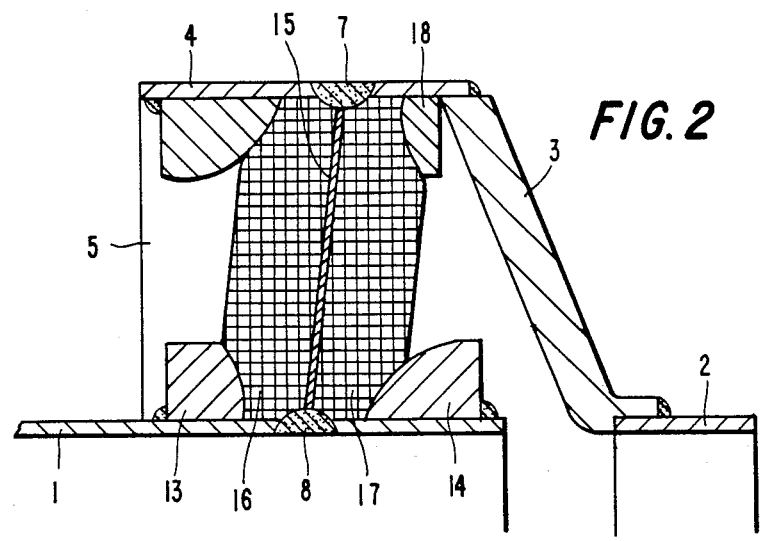

Embodiment of FIG. 2:

The basic structure is similar to that described in connection with FIG. 1, except that the sealing membrane 15 as well as cushions 16 and 17 are not symmetrical or at right angles with respect to the axis of the pipes but, rather, are at an inclination with respect to a rotary axis of the pipes. This results in differential acceptance of forces being transferred in axial direction between the pipe ends 1, 2, in dependence on the direction from which pressure or loading is applied, from right towards left or from left towards right.

The various structural elements not specifically described and having the same reference numerals as those of FIG. 1 will have the same function. The support ring 18 will be shaped and dimensioned differently from the support ring 12 (FIG. 1) due to the inclination of the membrane 15.

Figure 3:
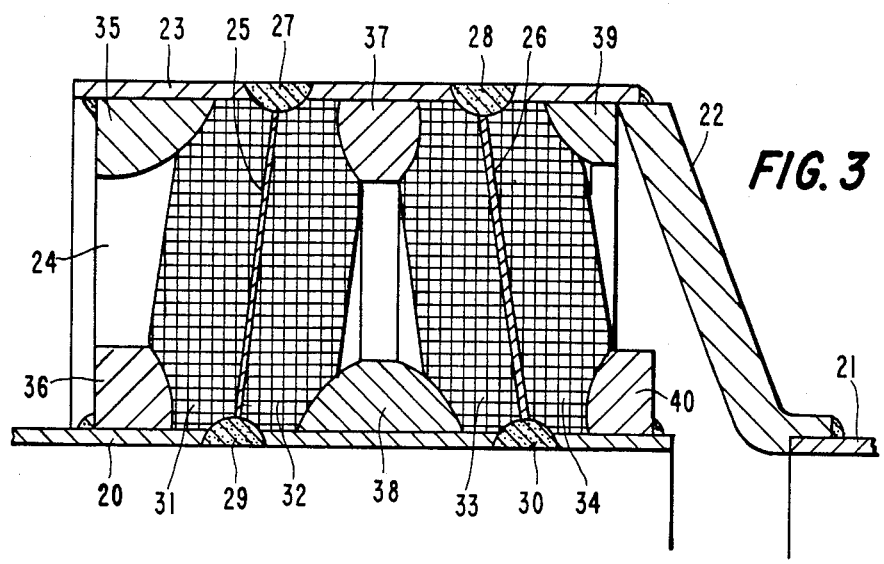

Embodiment of FIG. 3:

Dual membranes 25, 26 are provided, both inclined, but with opposite angles of inclination. Pipe end 21, facing pipe end 20, has an inclined flange 22 secured thereto, to which a sleeve element 23 is welded, defining a ring chamber 24 between the inner wall of sleeve 23 and the outer wall of the pipe end 20. Two multi-layer sealing membranes 25, 26 are located in the ring chamber, each welded along the outer circumference 27, 28, respectively, with the walls of the sleeve 23 and, at their inner circumferences 29, 30, welded to the pipe end 20. As can be clearly seen in FIG. 3, the membranes 25, 26 are inclined with respect to the axis of rotation of the pipes 20, 21, the angles of inclination projecting towards each other at the outer circumference.

Three sealing and support cushions or pillows can be provided or, as shown, four pillows or cushions 31, 32, 33, 34, located between respective support rings 35, 36, 37, 38, 39, 40, to support their outer and inner circumferential regions of the respective sealing and support rings. The sealing and support rings are welded to, or included in the welding beads 27-30. The support rings 37, 38 support, at opposite sides, the respective sealing cushions 32, 33.

The sealing and support pillows 31-34 are preferably compacted or compressed or more dense at their inner and outer circumferential regions, so that they can be readily combined with or joined to the sealing or bonding beads 27-30, even if the sealing and support cushions are made of a wire mesh or wire woven or knitted material, or are formed of such materials which are highly compressed or of compressed fibers, typically of wire fiber or wire filament elements.

Figure 4:
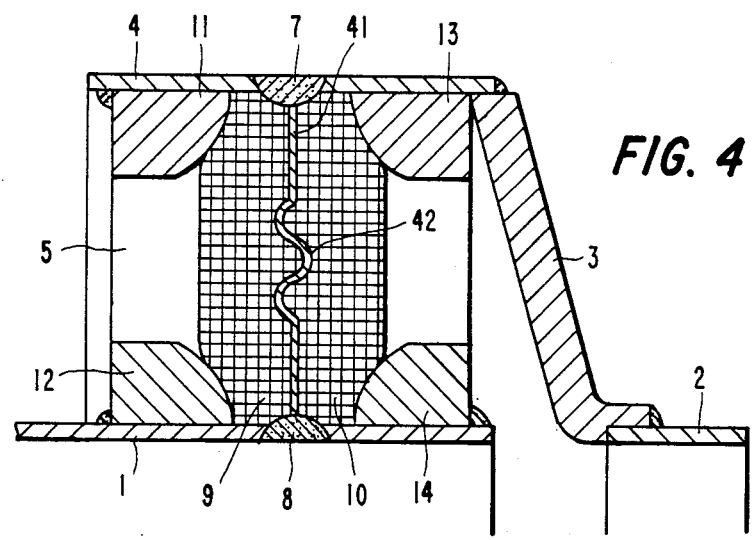

Embodiment of FIG. 4:

The structure is similar to FIG. 1 and identical parts, with the same reference numerals, will not be described again. The difference is the shape of the membrane which, as seen in FIG. 4 as membrane 41, is formed with circumferential corrugations 42, providing for particularly good flexibility and acceptance of angular and axial movement between the pipe ends 1, 2.

Figure 5:
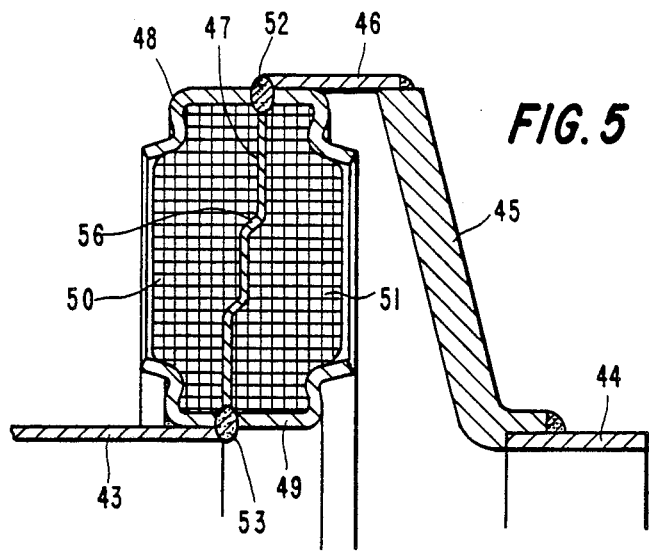

Embodiment of FIG. 5:

The coaxial pipes 43, 44 are located in alignment; pipe 44 has a flange 45 welded thereto from which a cylindrical sleeve 46 extends.

Differing from the previously described embodiments, sealing membrane 47 is welded between two holder rings 48, 49 which define the ring space. Sealing cushions or pillows 50, 51 are located adjacent the membrane 47. The sealing and support cushions or pillows 50, 51 are held in position by respectively inturned and down-turned edge portions of the holder rings 48, 49 to clamp around the end parts of the sealing and support rings and thus hold the sealing and support rings in a jaw grip. The jaw grips provide, additionally, for axial compression of the sealing and support rings at their respective end portions or zones.

The membrane 47 may be straight, as shown in FIG. 1, inclined, as shown in FIG. 2, or, as shown in FIG. 5, may have a stepped or offset form, by including offsets 56 therein; the offsets 56 form a stepped configuration extending, of course, in ring shape circumferentially around the pipes.

Figure 6:
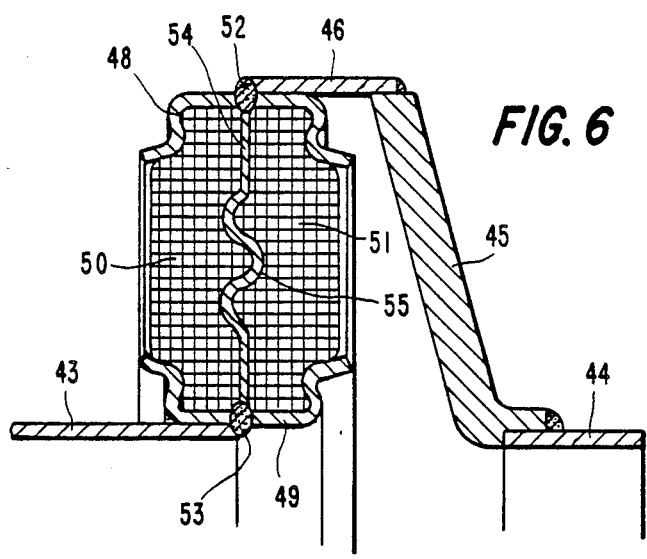

Embodiment of FIG. 6:

The general embodiment is identical to that described in connection with FIG. 5, except that the membrane 54 is formed with ring corrugations, similar to the embodiment of FIG. 4.

In both the embodiments of FIGS. 5 and 6, the elements 47 and 51 can form a subassembly which can be pre-manufactured or pre-assembled and, in complete assembly, welded by welding beads 52, 53, to the respective pipe end 43 and the sleeve 46.

Figure 7:
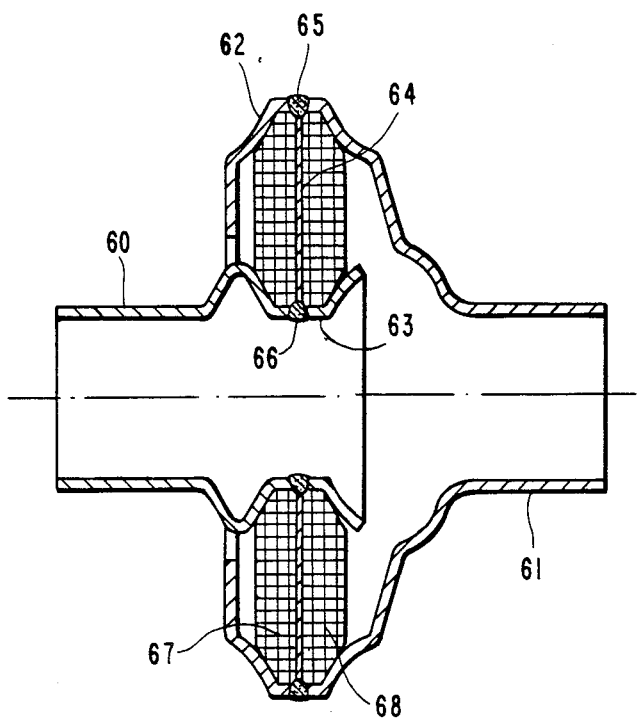

Embodiment of FIG. 7:

Rather than welding a flange, like flange 45 (FIG. 6), and a sleeve 46 (FIG. 6) on a pipe, the pipe ends can be deformed to hold the sealing arrangement in position.

FIG. 7 illustrates an embodiment which is a variation on that of FIGS. 5 and 6. The pipe ends 60, 61 are formed with holding portions 62, 63 between which a sealing membrane 64 is welded as shown by welding beads 65, 66. Sealing and support cushions or pillows in ring shape are shown at 67, 68, fitted in and held in position by the deformed end portions of the respective pipes 60, 61.

Figure 8:
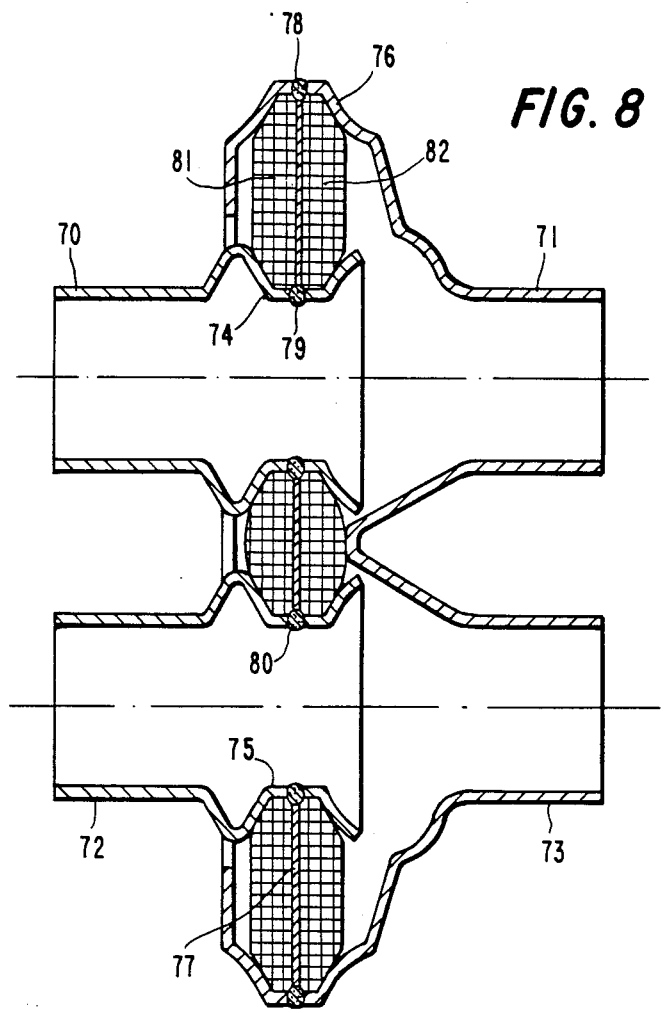
FIG. 8 is an axial cross-sectional view through a multi-pipe sealing arrangement.

The sealing arrangement is applicable not only to single pipe connections but may, also, be used to connect two pipes to a dual-pipe combination. FIGS. 8 and 9 illustrate a dual-pipe structure in twin form, in which dual-pipe units are coupled to individual pipes. FIG. 9 is a perspective, exploded view of the cross-sectional structure of FIG. 8.

Two individual inlet pipes 70, 72 are to be coupled to a paired twin tube structure having tubes 72, 73. The pipe ends 70, 72 are formed, as shown in FIG. 7, with an end holding corrugation at 74, 75, respectively. A common, oval holding ring 76 is formed at the end portions of the twin pipes 71, 73, see specifically FIG. 9. The space between the holder ring 76 and the respective seating portion 74, 75 of the pipes 70, 72 is filled with a sealing and support structure which includes a sealing membrane 77, which has an external shape and dimension matching the shape and dimension of the flange 76 at its largest extent, and internally is formed with two circular openings to match the seats 74, 75 of the pipes 70, 72. The membrane, therefore, has what may be termed generally "eye-glass" shape. The membrane, in accordance with the invention, is bonded, preferably by welding, at its outer and inner circumferences to the respective pipe element 76 and 74, 75.

Sealing and support cushions 81, 82, likewise of "eye-glass" shape, are located adjacent both sides of the membrane 77.

The arrangement of FIGS. 8 and 9 permits two adjacently located pipes to be connected flexibly and compactly to twin receiving pipes, in which, due to the central portion of the membrane 77, the fluids in the two pipes 70, 71 and 72, 73 are separated from each other.

The connection between the aligned pipe ends is absolutely tight, with high stiffness with respect to torsional forces between the respectively aligned pipes. Yet, flexibility with respect to axial or angular relative movement of the coupled pipes is possible, and can be controlled within wide limits, depending on the stiffness of the sealing membrane which is used, the strength, packing density or compression of the sealing and support cushions, and the shape and configuration of the membrane as such, for example whether straight (FIG. 1), corrugated (FIG. 4), stepped (FIG. 5) and/or radially straight or inclined (FIGS. 1, 2 and 3).

Various changes and modifications may be made and any one of the membranes or holding arrangements as directed may be used in configuration with an embodiment show in a different drawing.

The membranes can be held in position in various ways. Support rings 11–14 (FIG. 1) can be provided which can all be identical or differ in size or shape—compare FIGS. 1, 2 and 3. Alternatively, the end portions of the pipe elements can be shaped to form support rings which are integral with the pipe ends, see for example FIG. 7; or dual support rings can be additionally secured to the pipe ends, see for example FIGS. 5 and 6, which, further, can be combined into a single unitary subassembly. Holder rings to hold the sealing and support cushions or rings can be integral with the respective pipe ends (FIGS. 7, 8, 9) or separately attached thereto (FIGS. 1 to 6), and if separate, preferably connected by welding. Regardless of the particular way in which the sealing and support pillows are held in position, they are preferably bonded at the inner and outer circumference to the adjacent pipe end and/or surrounding support structure defining the essentially ring-shaped chamber. Jaw-like clamping arrangements additionally permit pre-compression of the sealing and support rings. Forming the sealing and support rings in combination with compression rings (FIGS. 5, 6) permits pre-manufacture of subassemblies which can be easily welded into respective pipe ends; such connecting parts then may form repair parts or repair subassemblies which can be secured to, for example, a replacement pipe end after cutting off a portion of a prior pipe end which, for example, may have corroded.

Preferably, the material of the respective sealing and support cushions or pillows is additionally made more dense or compressed along the region of its inner and outer circumference and, if desired, may be welded or otherwise bonded to the adjacent walls of the ring space. This additional attachment to the walls defining the ring space increases the stability and hence mechanical strength of the pipe connection and prevents settling of the material of the support cushion, and thus maintains the force-displacement path characteristics, and provides for enhanced protection of the sealing membrane. Additionally, coupling the sealing and support cushions to the pipe ends increases the resistance with respect to torsional loading, and thus increases the overall load carrying capability with respect to torsional forces.

The sealing membrane, preferably, is a multi-layer structure so that failure of any one layer will not, necessarily, result in leakage.

Corrugating or stepping the membrane (FIGS. 5, 6) increase the flexibility of the membrane and additionally prevents the formation of small folds or creases without, however, interfering with the sealing function and the capability to accept torsional forces.

Locating the membrane at an inclined plane with respect to the rotary axis of the pipes, so that the membranes actually will have a centrally conical form, rather than ring form, changes the force acceptance characteristics with respect to axial forces. By suitably selecting the angle of inclination, substantial axial forces in one direction can be accepted without substantial displacement of the unit, whereas forces in the other direction permit greater flexibility and movement. In dependence on the desired use, the angle of the respective sealing element can be suitably selected. By providing two membranes, inclined at opposite direction (FIG. 3) for example, acceptance of axial forces in both opposite directions is substantially enhanced.

The invention is not limited to coupling individual single pipes together, but multi-pipe units may also be coupled. Thus, the term "ring-shaped space" is intended to mean not only a circular ring space but, generally, a space which is essentially ring-formed, but may be oval with two or more ring portions, separated by openings for passage of the respective fluid, see FIGS. 8 and 9. This is particularly suitable for exhaust gases from automotive engines since a very compact construction can be obtained, for example to carry away exhaust gases from dual-in-line or V-engines.

Various other changes and modifications may be made and any features described in connection with any one of the embodiments may be used with any others within the scope of the inventive concept.

Figure 11A:
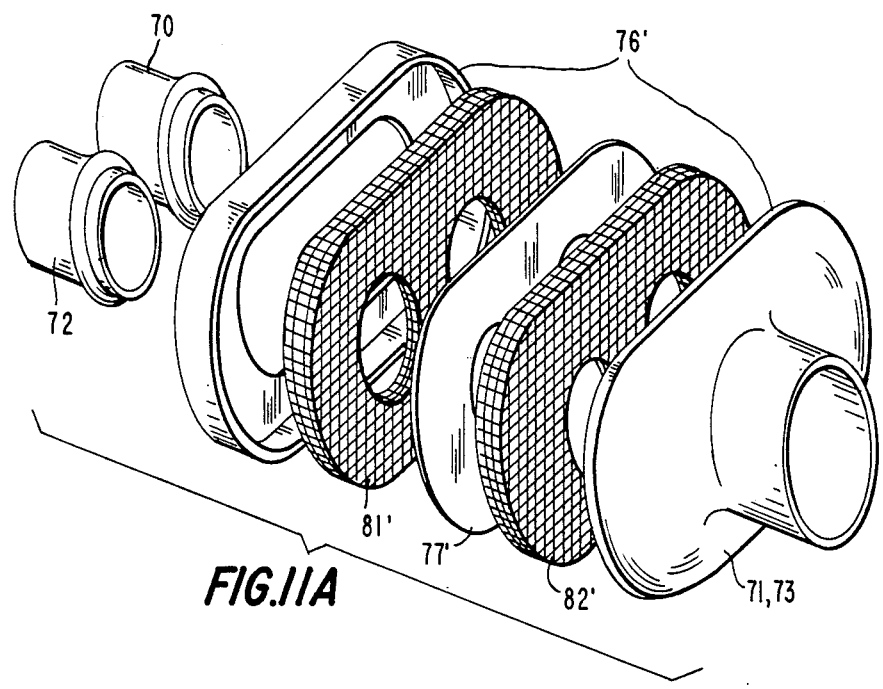
FIG. 11A, is an exploded perspective view of the arrangement of FIG. 10.
Figure 11B:
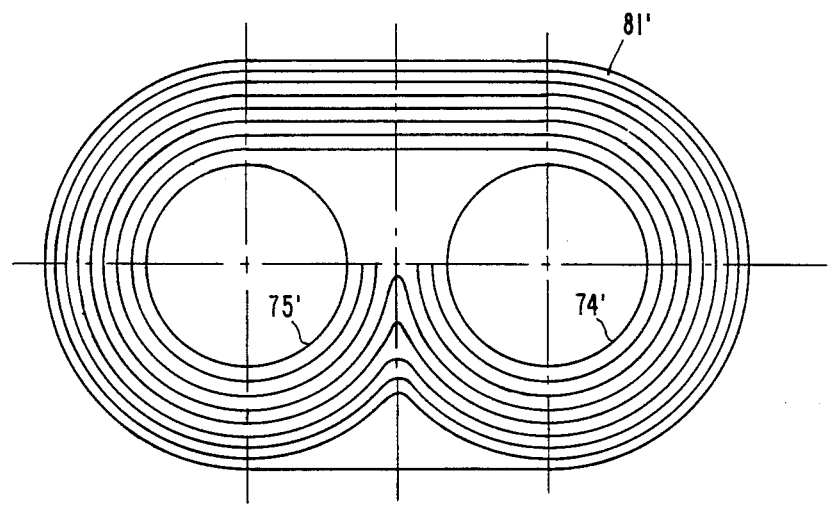
FIG. 11B, is a highly schematic end view of a sealing cushion for use in the arrangement of FIG. 11A.

For example, in the embodiment of FIGS. 8 and 9, it is not necessary that the two individual pipes 70, 72 direct the fluid therefrom to two outlet pipe elements 71, 73. FIGS. 10, 11A and 11B illustrate an arrangement in which a single outlet pipe 7173 is used; elements similar to those of FIGS. 8 and 9 have been given similar reference numerals, with prime notation, where appropriate. The outlet pipe elements 71, 73 can be a single pipe structure 71, 73, for example of an outer oval shape covering the space of the two pipe elements 71, 73; or, alternatively, the membrane as well as the sealing cushions can be expanded to be circular with an outer diameter corresponding to the maximum diameter of the flange portion 76 (FIG. 9) taken from a central point of the structure, with an outlet pipe 71, 73 coupled thereto having, for example, a diameter matching the maximum distance between the walls of the inlet pipes 70, 72. For such a construction, the inner flanges of the holding ridges of the inlet pipes 70, 71, 72 preferably extend to about the center of the structure to protect the inner sealing and support cushion corresponding to cushion 82.

We claim:

1. A connection arrangement to connect two pipes, particularly for conveying hot fluids, especially exhaust gases from an internal combustion engine, said connection arrangement permitting relative movement of the two pipes with respect to each other in axial and angular direction, while maintaining a sealed connection and preventing escape of fluid to ambient space, and resisting movement with respect to torsional relative movement of the two pipes, comprising
means for defining a ring space (5, 24) surrounding the end portions of the pipes;
at least one sealing and support cushion or pillow (9, 10; 16, 17; 31, 32; 33, 34; 50, 51; 67, 68; 81, 82) located in the ring chamber or space, the material of said sealing and support cushions or pillows having damped springy characteristics and being temperature and corrosion-resistant;
a sealing membrane (6, 15, 24, 26, 41, 47, 54, 64, 77) positioned adjacent the sealing and support cushion or pillow and extending over the entire radial region of said ring chamber or space,
and wherein, in accordance with the invention,
the sealing membrane (6, 15, 24, 26, 41, 47, 54, 64, 77) is welded along an inner and outer circumference thereof with adjacent walls (1, 4; 20, 23; 48, 49; 62, 63; 74, 75, 76) of said means for defining the ring chamber.

2. The arrangement of claim 1, wherein two sealing and support cushions or pillows are provided, one each being located adjacent a major surface of said membrane, to support the respective sides of the membrane.

3. The arrangement of claim 2, further including (FIGS. 5-9) holder rings (48, 49, 62, 63, 74-76) retaining the sealing membrane (47, 54, 64, 77) and the respective sealing and support cushions or pillows (50, 51, 67, 68, 81, 82) in position; and wherein said holder rings are coupled with the end portions (43, 44; 60, 61; 70-73) of the pipes.

4. The arrangement of claim 3, wherein (FIGS. 7-9) the holder rings (62, 63; 74-76) are unitary with the end portions (60, 61; 70-73) of the respective pipes.

5. The arrangement of claim 3, wherein (FIGS. 5, 6) the holder rings and the sealing and support cushion or pillow forms a unitary subassembly.

6. The arrangement of claim 3, wherein (FIGS. 5, 6) the holder rings (48, 49) are coupled to the end portions (43, 44) of the pipes by weld connections (52, 53).

7. The arrangement of claim 3, wherein the holder rings (48, 49; 62, 63; 74-76) extend axially around at least a part of said sealing and support cushion or pillow (50, 51; 67, 68; 81, 82) along at least one of the interior and exterior circumferences and are shaped to form clamping surfaces for clamping the sealing and support cushion or pillow, with the respective sealing membranes (47, 54, 67, 77) therebetween in position.

8. The arrangement of claim 7, wherein said clamping surfaces apply a compression and compaction force against the respective sealing and support cushions or pillows.

9. The arrangement of claim 1, further including support ring means (11, 14; 18, 35-40, 63) secured to the means for defining the ring chamber and located in engagement with the at least one sealing and support cushion or pillow at the side remote from said membrane.

10. The arrangement of claim 9, wherein said support ring means are positioned with respect to the at least one sealing and support cushion or pillow to compress and compact the material of the sealing and support cushion or pillow in the region adjacent said walls.

11. The arrangement of claim 9, wherein said support ring means have rounded smooth surfaces facing the respective sealing and support cushion or pillow.

12. The arrangement of claim 1, wherein the sealing and support cushion or pillow is compacted adjacent its external and internal circumferential region, and bonded to the respective adjacent walls of said means defining the ring chamber.

13. The arrangement of claim 1, wherein the sealing and support cushion or pillow is compacted adjacent its external and internal circumferential region, and welded to the respective adjacent walls of said means defining the ring chamber.

14. The arrangement of claim 1, wherein the sealing membrane comprises a multi-layer structure.

15. The arrangement of claim 1, wherein (FIGS. 4–6) the sealing membrane (41, 47, 54) is formed with at least one circumferential at least part step, or undulation (42, 55, 56).

16. The arrangement of claim 1, wherein (FIGS. 2, 3) the sealing membrane (15, 25, 26) and the at least one sealing and support cushion or pillow form a sealing combination, in which the sealing membrane and the adjacent surface of the sealing and support cushion or pillow are inclined with respect to a plane transverse to the axes of the pipes.

17. The arrangement of claim 1, wherein (FIGS. 8, 9) the two pipes comprise two respectively parallel pipe elements (70, 71; 72, 73) each, the outer walls of the means defining said ring chamber or space forming a common oval holder ring portion (76); and wherein the sealing membrane (77) and the at least one sealing and support cushion or pillow (81, 82) form a sealing assembly having two openings to receive the respective pipe elements.

18. The arrangement according of claim 1, wherein two sealing and support cushions or pillows are provided, one each being located adjacent a major surface of said membrane; and
wherein the means for defining the ring space (5, 24) comprises a corrugation having a depressed ring shape zone and adjacent projecting ridges formed at the end portion of one of the pipes and an open cup-like end bell adjacent the end portion of the other pipe, and having a diameter greater than the diameter of the projecting ridges.

19. The arrangement of claim 18, wherein said membrane is welded to said one pipe in the region of the ring-shaped depression, and to the other pipe at an inner surface of said end bell.

20. For combination with a connection arrangement to connect two pipes, particularly for conveying hot fluids, especially exhaust gases from an internal combustion engine, said connection arrangement permitting relative movement of the two pipes with respect to each other in axial and angular direction, while maintaining a sealed connection and preventing escape of fluid to ambient space, and resisting movement with respect to torsional relative movement of the two pipes, comprising
means for defining a ring space (5, 24) surrounding the end portions of the pipes;
two sealing and support cushions or pillows (50, 51) located in the ring chamber or space, the material of said sealing and support cushions or pillows having damped springy characteristics and being temperature and corrosion-resistant;
a sealing membrane (6, 15, 24, 26, 41, 47, 54, 64, 77) positioned between the respective sealing and support cushions or pillows and extending over the entire radial region of said ring chamber or space,
a subassembly comprising
two holder rings (48, 49) concentrically positioned with respect to each other and defining at least a portion of the ring space therebetween,
wherein the sealing membrane is ring-shaped and bonded along an inner and outer circumference thereof with adjacent walls of the holder rings, said holder rings are formed with axially extending portions facing each other and projecting at least over part of said sealing and support cushions or pillows (50, 51) located adjacent the sealing membrane, and clamping the respective sealing and support cushions or pillows, with the respective sealing membrane therebetween, in position; and
wherein the outer one of said concentric holder rings is dimensioned and shaped to fit within one of said two pipes, and the inner one of said concentric holder rings is dimensioned and shaped to fit around the outer circumference of the other of said pipes.

21. The subassembly of claim 20, wherein said membrane is welded at its inner and outer circumferences to the respective inner and outer holder rings.

22. A connection arrangement to connect two pipes, particularly for conveying hot fluids, especially exhaust gases from an internal combustion engine, said connection arrangement permitting relative movement of the two pipes with respect to each other in axial and angular direction, while maintaining a sealed connection and preventing escape of fluid to ambient space, and resisting movement with respect to torsional relative movement of the two pipes, comprising
means for defining a ring space (5, 24) surrounding the end portions of the pipes;
two sealing and support cushions or pillows (9, 10; 16, 17; 31, 32; 33, 34; 50, 51; 57, 68; 81, 82) located in the ring chamber or space, the material of said sealing and support cushions or pillows having damped springy characteristics and being temperature and corrosion-resistant;
a sealing membrane (6, 15, 24, 26, 41, 47, 54, 64, 77) extending over the entire radial region of said ring chamber or space,
and wherein
the sealing membrane (6, 15, 24, 26, 41, 47, 54, 64, 77) is bonded along an inner and outer circumference thereof with adjacent walls (1, 4; 20, 23; 48, 49; 62, 63; 74, 75, 76) of said means for defining the ring chamber;
wherein the sealing membrane is located between said sealing or support cushions or pillows so that one each of said support cushions or pillows is located adjacent a major surface of said membrane and supports the respective side of the membrane.

* * * * *